(12) United States Patent
Stenlund

(10) Patent No.: US 11,624,230 B2
(45) Date of Patent: Apr. 11, 2023

(54) ROLLER SHUTTER FOR SECURING A PHYSICAL SPACE WITHIN A VEHICLE

(71) Applicant: ASSA ABLOY AB, Stockholm (SE)

(72) Inventor: Peter Stenlund, Stockholm (SE)

(73) Assignee: ASSA ABLOY AB, Stockholm (SE)

( * ) Notice: Subject to any disclaimer, the term of this patent is extended or adjusted under 35 U.S.C. 154(b) by 279 days.

(21) Appl. No.: 16/756,751

(22) PCT Filed: Oct. 23, 2018

(86) PCT No.: PCT/EP2018/078985
§ 371 (c)(1),
(2) Date: Apr. 16, 2020

(87) PCT Pub. No.: WO2019/081478
PCT Pub. Date: May 2, 2019

(65) Prior Publication Data
US 2021/0189789 A1    Jun. 24, 2021

(30) Foreign Application Priority Data

Oct. 24, 2017   (EP) ..................................... 17198095

(51) Int. Cl.
*B60R 25/10* (2013.01)
*E05F 15/76* (2015.01)
*E05F 15/44* (2015.01)

(52) U.S. Cl.
CPC .......... *E05F 15/76* (2015.01); *B60R 25/1004* (2013.01); *E05F 15/44* (2015.01); *E05Y 2400/525* (2013.01); *E05Y 2900/532* (2013.01)

(58) Field of Classification Search
CPC ...... E05F 15/76; E05F 15/44; B60R 25/1004; E05Y 2900/532; G08B 25/008; G08B 13/126
See application file for complete search history.

(56) References Cited

U.S. PATENT DOCUMENTS 3,952,566 A * 4/1976 Jacobson ................ F16C 19/52
                                                        73/593
5,049,854 A * 9/1991 Wolf .................... G08B 13/126
                                                        109/42
(Continued)

FOREIGN PATENT DOCUMENTS

CN            1668821           9/2005
CN          202728373           2/2013
(Continued)

OTHER PUBLICATIONS

English Translation of Official Action for China Patent Application No. 201880068831.9, dated Feb. 20, 2021, 14 pages.
(Continued)

*Primary Examiner* — John A Tweel, Jr.
(74) *Attorney, Agent, or Firm* — Sheridan Ross P.C.

(57) ABSTRACT

It is provided a roller shutter for securing a physical space within a vehicle. The roller shutter comprises: a protective barrier configured to be in a rolled up, open, state, and in a rolled down, protective state; a mesh of conductors being attached to the protective barrier; a processor; and a memory storing instructions that, when executed by the processor, cause the roller shutter to: detect a physical break in the mesh of conductors; when a break in the mesh of conductors is connected, signal that a break-in is detected, determine a valid open request; open the roller shutter when the valid open request is determined; determine when a user has exited the vehicle; and close the roller shutter when the user exit has been determined.

10 Claims, 4 Drawing Sheets

(56) References Cited

U.S. PATENT DOCUMENTS

| | | | | |
|---|---|---|---|---|
| 5,274,357 | A | * | 12/1993 | Riordan ................. G08B 13/08 340/545.8 |
| 5,686,909 | A | | 11/1997 | Steinhauser |
| 9,834,984 | B2 | * | 12/2017 | Fiedler ................. H04L 12/6418 |
| 11,492,838 | B2 | * | 11/2022 | Evans ................. B65G 69/2811 |
| 2006/0071755 | A1 | | 4/2006 | Muller et al. |
| 2015/0226146 | A1 | | 8/2015 | Elwart et al. |
| 2018/0001750 | A1 | | 1/2018 | Miller |
| 2018/0361831 | A1 | * | 12/2018 | Buttolo ................. B60J 1/2086 |
| 2020/0090425 | A1 | * | 3/2020 | Senft-Grupp ............ G07C 5/08 |

FOREIGN PATENT DOCUMENTS

| | | |
|---|---|---|
| CN | 103114797 | 5/2013 |
| CN | 104827989 | 8/2015 |
| CN | 104933781 | 9/2015 |
| CN | 105649512 | 6/2016 |
| CN | 107206878 | 9/2017 |
| CN | 206568856 | 10/2017 |
| DE | 2628766 | 1/1978 |
| DE | 4008441 | 9/1991 |
| GB | 2203262 | 10/1988 |
| GB | 2472904 | 2/2011 |
| WO | WO 83/00246 | 1/1983 |
| WO | WO 87/06749 | 11/1987 |
| WO | WO 03/024755 | 3/2003 |
| WO | WO 03/093077 | 11/2003 |

OTHER PUBLICATIONS

Partial Search Report for European Patent Application No. 17198095.6, dated Apr. 5, 2018, 11 pages.

International Search Report and Written Opinion for International (PCT) Patent Application No. PCT/EP2018/078985, dated Nov. 22, 2018, 14 pages.

* cited by examiner

ROLLER SHUTTER FOR SECURING A PHYSICAL SPACE WITHIN A VEHICLE

CROSS REFERENCE TO RELATED APPLICATIONS

This application is a national stage application under 35 U.S.C. 371 and claims the benefit of PCT Application No. PCT/EP2018/078985 having an international filing date of 23 Oct. 2018 which designated the United States, which PCT application claimed the benefit of European Patent Application No. 17198095.6 filed 24 Oct. 2017, the disclosure of each of which are incorporated herein by reference.

TECHNICAL FIELD

The invention relates to a roller shutter for securing a physical space within a vehicle and corresponding vehicle, method, computer program and computer program product.

BACKGROUND

With online shopping steadily increasing, deliveries of physical goods are also increasing. Consumers want fast and cheap delivery and the delivery companies want efficiency and safety for their deliveries.

Thefts from delivery vehicles and attacks against drivers are increasing since the value of the goods increases.

Drivers have very busy routes with many stops. Current security solutions for delivery vehicles rely on traditional vehicle locks or even padlocks. It is very inconvenient for the drivers to secure the vehicle each time a delivery takes place. Moreover, the detection of a break-in is often not reliable.

SUMMARY

It is an object to provide better and more convenient security for cargo vehicles.

According to a first aspect, it is provided a roller shutter for securing a physical space within a vehicle. The roller shutter comprises: a protective barrier configured to be in a rolled up, open, state, and in a rolled down, protective state; a mesh of conductors being attached to the protective barrier; a processor; and a memory storing instructions that, when executed by the processor, cause the roller shutter to: detect a physical break in the mesh of conductors; when a break in the mesh of conductors is connected, signal that a break-in is detected; determine a valid open request; open the roller shutter when the valid open request is determined; determine when a user has exited the vehicle; and close the roller shutter when the user exit has been determined.

The mesh of conductors may comprise a mesh of wires.

The instructions to determine when a user has exited the vehicle may be based on a signal from an accelerometer attached to the vehicle.

The instructions to determine when a user has exited the vehicle may be based on a signal from an accelerometer attached to the user.

According to a second aspect, it is provided a vehicle comprising the roller shutter according to any one of the preceding claims.

According to a third aspect, it is provided a method for securing a physical space within a vehicle using a roller shutter. The roller shutter comprises a protective barrier configured to be in a rolled up, open, state, and in a rolled down, protective state. The roller shutter further comprises a mesh of conductors being attached to the protective barrier. The method comprises the steps of: detecting a physical break in the mesh of the conductors; signalling that a break-in is detected when a break in the mesh of conductors is connected; determining a valid open request; opening the roller shutter when the valid open request is determined; determining when a user has exited the vehicle; and closing the roller shutter when the user exit has been determined.

The mesh of conductors may comprise a mesh of wires.

The method may further comprise the steps of: determining a valid open request; opening the roller shutter when the valid open request is determined; determining when a user has exited the vehicle; and closing the roller shutter when the user exit has been determined.

The step of determining when a user has exited the vehicle may be based on a signal from an accelerometer attached to the vehicle.

The step of determining when a user has exited the vehicle may be based on a signal from an accelerometer attached to the user.

According to a fourth aspect, it is provided a computer program for securing a physical space within a vehicle using a roller shutter. The roller shutter comprises a protective barrier configured to be in a rolled up, open, state, and in a rolled down, protective state, and a mesh of conductors being attached to the protective barrier. The computer program comprises computer program code which, when run on a roller shutter causes the roller shutter to: detect a physical break in the mesh of conductors; signal that a break-in is detected when a break in the mesh of conductors is connected; determine a valid open request; open the roller shutter when the valid open request is determined; determine when a user has exited the vehicle; and close the roller shutter when the user exit has been determined.

According to a fifth aspect, it is provided a computer program product comprising a computer program according to the fourth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Embodiments presented herein are based on the idea that the cargo area of a vehicle is secured not only by a tail lift, but also by a roller shutter. In this way, when the user (e.g. driver) leaves the vehicle for a delivery, it is sufficient if the roller shutter is closed and locked, while the tail lift can be left in an open position. This can be of great value, especially when the driver needs to go back and forth between the vehicle and the delivery address several times.

Figure 1:
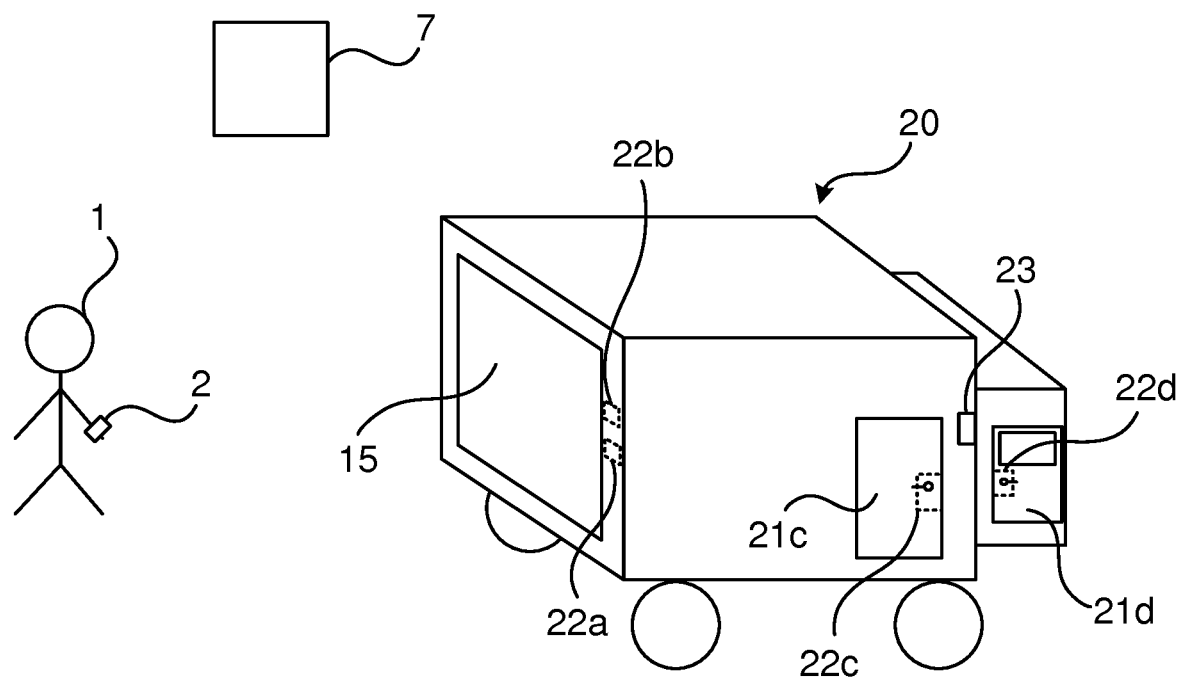
FIG. 1 is a schematic diagram illustrating an environment in which embodiments presented herein can be applied.

FIG. 1 is a schematic diagram illustrating an environment in which embodiments presented herein can be applied.

A user 1 is a logistics person associated with a vehicle 20, for instance the currently assigned driver of the vehicle. The vehicle 20 is suitable for carrying cargo and can be a van, a lorry, a car, etc. The cargo can be loaded in the vehicle 20 e.g. in the form of boxes, optionally on pallets.

The vehicle 20 is provided with a tail lift 15 and one or more cabin doors 21d (only one seen in FIG. 1). Optionally, a side door 21c for access to the cargo area of the vehicle is provided. It is to be noted that the vehicle can comprise a trailer for which the tail lift and roller shutter can be controlled in the same manner as the tail lift 15 and roller shutter of the vehicle itself.

A tail lift 15 secures the back of the vehicle. To operate the tail lift, a first electronic lock 22a is provided. A second electronic lock 22b is provided to secure the operation of a roller shutter (not seen in FIG. 1 but shown in FIGS. 2A-B). The cabin door(s) 21d are secured by a fourth electronic lock 22d and the optional side door 21C is secured by an optional third electronic lock 22C. Optionally, an electronic access control device 23 controls access to operation of the vehicle, corresponding to an ignition key.

The user 1 carries a wearable device 2. A wearable device 2 is an electronic device which can be worn by the user. For instance the wearable device can be in the form of a wristband or watch. As explained in more detail below, the wearable device 2 is used to identify the user 1 using biometric sensors. The user can request access to a physical space by placing the wearable device 2 in close proximity (e.g. centimetres) or in contact with a tag (not shown) associated with the electronic lock securing the physical space in question. The communication between the tag and the wearable device 2 can e.g. be based on RFID (Radio Frequency Identification) or NFC (Near Field Communication). This will trigger the electronic lock to perform an access control procedure for the user identified by the wearable device 2. If the access control procedure is positive, the electronic lock will be set in an unlocked state, allowing the user to access the physical space. The same procedure can be used to set the electronic lock in a locked state.

When the first electronic lock 22a is set in an unlocked state, the user can control the tail lift 15 using traditional controls (which are disabled when the first electronic lock is set in a locked state) or by means of a user interface on the wearable device 2. Optionally, the tail lift 15 is lowered whenever the first electronic lock 22a is set in an unlocked state.

When the second electronic lock 22b is set in an unlocked state, the user can control the roller shutter using traditional controls (which are disabled when the first electronic lock is set in a locked state) or by means of a user interface on the wearable device 2. Optionally, the shutter roller is opened whenever the second electronic lock 22b is set in an unlocked state.

An access manager 7 is a computer which is used to allocate access to the user 1 as needed, to be able to open the electronic locks 22a-c as needed. The wearable device 2 can communicate with the access manager, e.g. using a cellular network module within the wearable device 2 or via a smartphone connected with the wearable device 2 over a short range wireless link.

A usage scenario in the environment illustrated in FIG. 1 will now be described.

At the start of a shift, the user 1 reports to a logistics centre, at which the user 1 is assigned a vehicle and a delivery schedule for the day. The user accepts by identifying him/herself using the wearable device.

Optionally, the vehicle can be started only after the user has provided identification on the wearable device.

Once the user arrives at a delivery location, the user exits the cabin and walks around to the back of the vehicle. The tail lift is lowered by the user providing identification on the wearable device. The roller shutter is opened in the same way. Once the user has picked up an item to be delivered, e.g. a parcel, the user exits the vehicle and closes the roller shutter by identifying using the wearable device.

Alternatively, an accelerometer in the vehicle is used to detect when the user has exited the vehicle, at which point roller shutter is closed and locked. This detection can be based on an absence of movement or based on movement which differs from a movement pattern of the user. The movement pattern of the user has in that case been calibrated in advance, by the user moving about the cargo space in the vehicle for 3-6 minutes when in a calibration mode.

Alternatively, the roller shutter is closed every time it is closed. The cabin doors can be locked automatically when the roller shutter is closed.

Figure 2A:
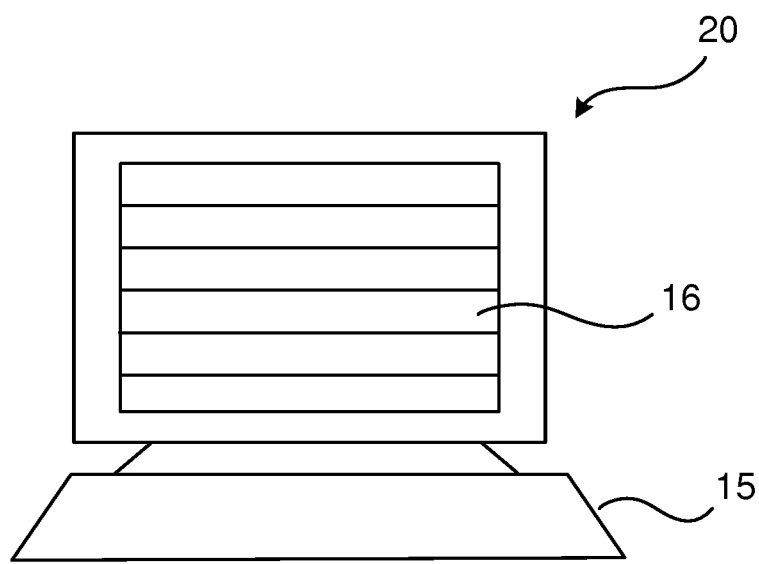
FIGS. 2A-B are schematic diagrams illustrating the use of a roller shutter in the vehicle of FIG. 1.
Figure 2B:
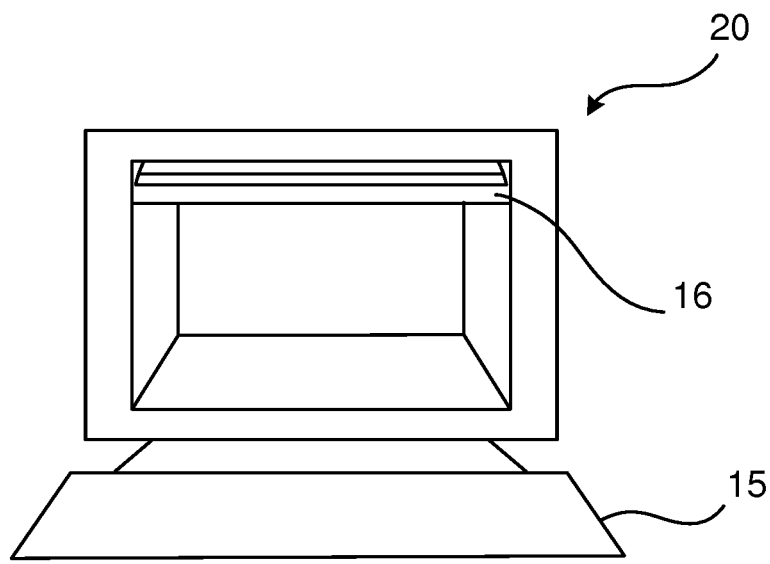

FIGS. 2A-B are schematic diagrams illustrating the use of a roller shutter 16 in the vehicle 20 of FIG. 1. The views are from the back of the vehicle 20. In both FIG. 2A and FIG. 2B, the tail lift 15 is lowered.

In FIG. 2A, the roller shutter 16 is in a closed (and locked) state, preventing any unauthorised persons from entering the cargo area. The roller shutter 16 is here in a rolled down, protective state.

In FIG. 2B, the roller shutter 16 is in an open state, whereby the cargo area can be accessed. The roller shutter 16 is here in a rolled up, open, state.

The cargo area of the vehicle is thus secured not only by the tail lift, but also by the roller shutter. In this way, when the user (e.g. driver) leaves the vehicle for a delivery, it is sufficient if the roller shutter is closed and locked, while the tail lift can be left in an open position. This can be of great value, especially when the driver needs to go back and forth between the vehicle and the recipient (or adjacent recipients) several times. Moreover, there is less mechanical wear on the tail lift when this does not need to be used to secure the cargo area.

Figure 3:
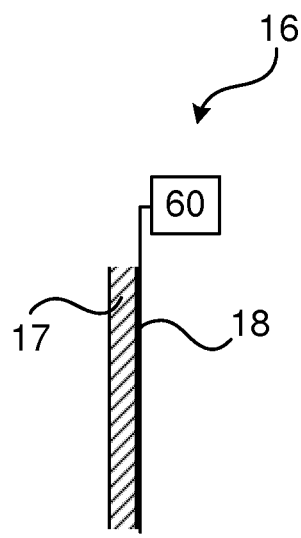
FIG. 3 is a schematic cross section of the roller shutter of FIGS. 2A-B with a connected controller.

FIG. 3 is a schematic cross section of the roller shutter of FIGS. 2A-B with a connected controller. A protective barrier 17 provides physical protection and is very difficult for an attacker to penetrate. The protective barrier 17 can be made by metal and/or reinforced plastic. The protective barrier 17 can optionally be made in a material which is thermally insulating, e.g. to keep a refrigerated cargo area cool.

The roller shutter 16 also comprises a mesh 18 of conductors being attached to the protective barrier. The conductor can be wires which stay functional during normal use but break easily when the protective barrier 17 is physically broken. The mesh 18 covers the entire area of the roller shutter when closed, see FIG. 2A. Moreover, a processor 6o is connected to the mesh 18. In this way, if an attacker manager to penetrate the protective barrier 17, the mesh 18 is also broken, which is detected by the processor 60. This can e.g. be detected by a variation in impedance greater than a threshold variation, when the impedance is measured between two opposite sides of the mesh 18.

Figure 4:
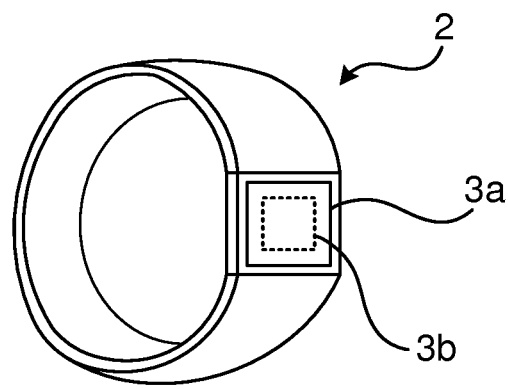
FIG. 4 is a schematic diagram illustrating an embodiment of a wearable device of FIG. 1.

FIG. 4 is a schematic diagram illustrating an embodiment of a wearable device 2 of FIG. 1 in the form of a wristband. The wearable device 2 comprises a first biometric sensor 3a for obtaining first biometric data and a second biometric sensor 3b for obtaining second biometric data. The second biometric sensor 3b captures second biometric data comprising a finger pressure parameter.

The wearable device 2 is configured to determine an identity of the user 1 based on the first biometric data and the second biometric data.

By measuring the finger pressure, an additional biometric parameter is captured which is difficult to copy and easy for the user to remember. The finger pressure parameter can be a curve of how the finger pressure varies over time, which improves the accuracy of identifying the user. The specific finger pressure pattern for the user needs to be captured initially, and may need to be periodically calibrated over time.

In this embodiment, the wearable device 2 is in the form of a wristband, to be worn around the wrist of the user.

The first biometric sensor 3a can be a fingerprint sensor. This allows for convenient identification of the user, e.g. by comparing a captured fingerprint with one or more templates.

Optionally, the first biometric sensor 3a is a blood flow sensor. The blood flow sensor captures the blood flow, which varies over time in a user specific manner. Hence, the blood flow over time can be compared with blood flow templates to determine an identity of the user. Since the first biometric sensor 3a is used for finger pressure detection, the user needs to press the wearable device towards the body. This increases the quality of blood flow capturing.

Optionally, the first biometric sensor 3a is a voice recognition unit. The spoken voice of a user is then captured using a microphone. The captured voice can be compared with voice templates to determine an identity of the user.

Optionally, the first biometric sensor 3a is an iris recognition unit. The iris of a user is then captured using a camera. The captured iris can be compared with iris templates to determine an identity of the user. The iris recognition unit can form part of the wearable device, or a rear vision camera of the vehicle can be used for this biometric sensor.

Optionally, the first biometric sensor 3a is an face recognition unit. The face of a user is then captured using a camera. The captured face can be compared with face templates to determine an identity of the user. The face recognition unit can form part of the wearable device, or a rear vision camera of the vehicle can be used for this biometric sensor.

Optionally, the first biometric sensor 3a is an accelerometer, optionally combined with a gyro. The movement pattern of a user is then captured using the accelerometer and optionally the gyro. The captured movement patter can be compared with movement templates to determine an identity of the user.

Optionally, the first biometric sensor 3a is a breathalyser. Presence and/or extent of components of expired air of a user is then captured. The captured presence and/or extent of components can be compared with templates to determine an identity of the user.

Hence, the first biometric sensor 3a can comprise any suitable sensor for sensing a biometric of the user. Optionally, additional biometric sensors can be added to further improve accuracy of user identifications. More sensors imply reduces risk of false positive and false negative identifications.

Figure 5:
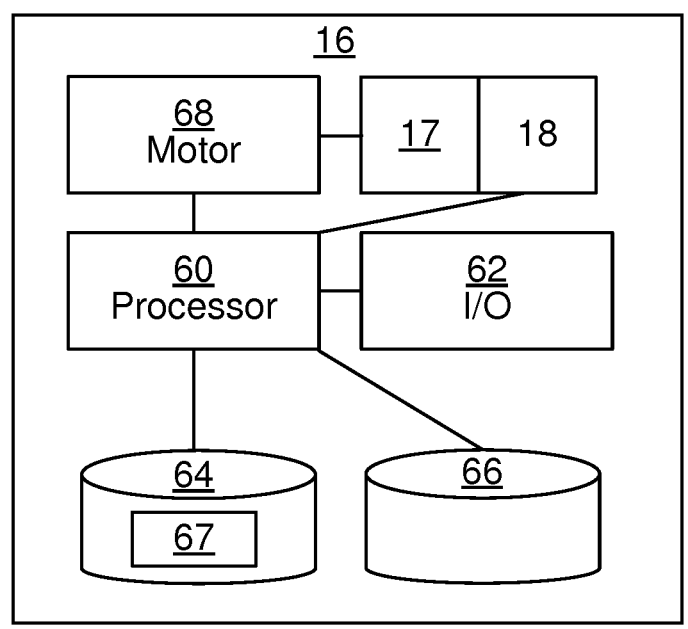
FIG. 5 is a schematic diagram illustrating components of the roller shutter of FIGS. 2A-B.

FIG. 5 is a schematic diagram illustrating components of the roller shutter 16 of FIGS. 2A-B. A processor 60 is provided using any combination of one or more of a suitable central processing unit (CPU), multiprocessor, microcontroller, digital signal processor (DSP), application specific integrated circuit etc., capable of executing software instructions 67 stored in a memory 64, which can thus be a computer program product. The processor 60 can be configured to execute the method described with reference to FIG. 6 below.

The memory 64 can be any combination of random access memory (RAM) and read only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of random access memory (RAM) and read only memory (ROM). The data memory 66 can e.g. comprise templates for biometric identification of a user.

The roller shutter 16 further comprises an I/O interface 62 for communicating with other external entities. Optionally, the I/O interface 62 also includes a user interface.

An electric motor 68 controls transitions of the protective barrier 17 (and the mesh 18) between rolled up and rolled down states (or any state in between), controlled by the processor 60. The processor 60 is connected to the mesh 18 to detect if the integrity of the mesh is compromised in any way, e.g. if it is broken.

Other components of the roller shutter 16 are omitted in order not to obscure the concepts presented herein.

Figure 6:
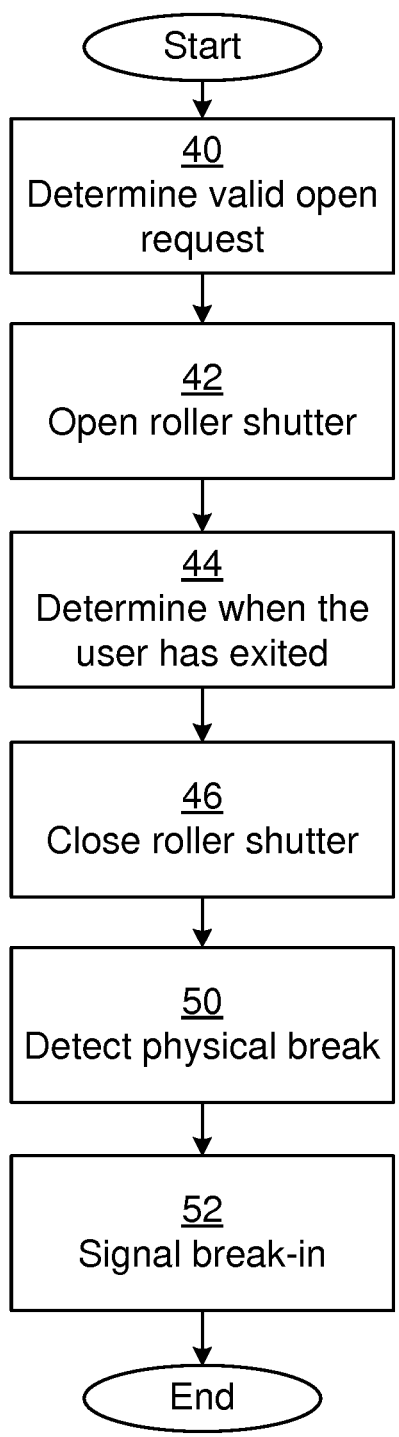
FIG. 6 is a flow chart illustrating a method for securing a physical space within a vehicle, performed in the roller shutter of FIGS. 2A-B.

FIG. 6 is a flow chart illustrating a method for securing a physical space within a vehicle, performed in the roller shutter of FIGS. 2A-B.

In a determine valid open request step 40, a valid open request is determined. This can e.g. be a signal from the second electronic lock that access is granted.

In an open roller shutter step 42, the roller shutter is opened when the valid open request is determined. This opening is effected by controlling the motor of the roller shutter to wind up the roller shutter.

In a determine when the user has exited step 44, it is determined when a user has exited the vehicle.

This determination can be based on a signal from an accelerometer attached to the vehicle. Alternatively or additionally, this determination is based on a signal from an accelerometer attached to the user.

In a close roller shutter step 46, the roller shutter is closed (to a closed and locked state). This occurs when the user exit has been determined. This closing is effected by controlling the motor of the roller shutter to wind down the roller shutter.

In a detect physical break step 50, a physical break in a mesh of the conductors is detected. The physical break can e.g. be detected as a variation in impedance greater than a threshold variation.

In a signal break-in step 52, signalling that a break-in is detected is performed when a break in the mesh of conductors is connected. The signalling can result in a siren being activated by the vehicle and/or that a central office is notified that a break-in is detected.

Figure 7:
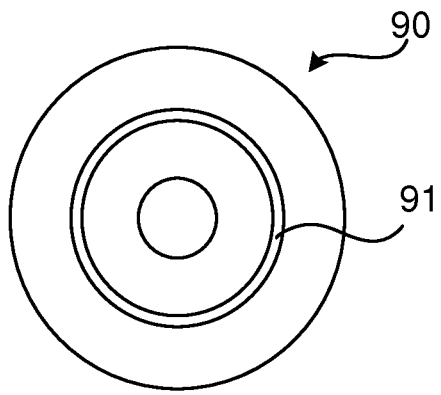
FIG. 7 shows one example of a computer program product comprising computer readable means.

FIG. 7 shows one example of a computer program product comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 4. While the computer program 91 is here schematically shown as a track on the depicted optical disk, the computer program can be stored in any way which is suitable for the computer program product, such as a removable solid state memory, e.g. a Universal Serial Bus (USB) drive.

Here now follows a list of embodiments from another perspective, enumerated with roman numerals.

i. A roller shutter for securing a physical space within a vehicle, the roller shutter comprising:
a protective barrier configured to be in a rolled up, open, state, and in a rolled down, protective state;
a mesh of conductors being attached to the protective barrier;
a processor; and
a memory storing instructions that, when executed by the processor, cause the roller shutter to:
detect a physical break in the mesh of conductors; and
when a break in the mesh of conductors is connected, signal that a break-in is detected.

ii. The roller shutter according to embodiment i, wherein the mesh of conductors comprises a mesh of wires.

iii. The roller shutter according to embodiment i or ii, wherein the memory further stores instructions that, when executed by the processor, cause the roller shutter to:
determine a valid open request;
open the roller shutter when the valid open request is determined;
determine when a user has exited the vehicle; and
close the roller shutter when the user exit has been determined.

iv. The roller shutter according to any one of the preceding embodiments, wherein the instructions to determine when a user has exited the vehicle are based on a signal from an accelerometer attached to the vehicle.

v. The roller shutter according to any one of the preceding embodiments, wherein the instructions to determine when a user has exited the vehicle are based on a signal from an accelerometer attached to the user.

vi. A vehicle comprising the roller shutter according to any one of the preceding embodiments.

vii. A method for securing a physical space within a vehicle using a roller shutter comprising a protective barrier configured to be in a rolled up, open, state, and in a rolled down, protective state, and a mesh of conductors being attached to the protective barrier, the method comprising the steps of:
detecting a physical break in the mesh of the conductors; and
signalling that a break-in is detected when a break in the mesh of conductors is connected.

viii. The method according to embodiment vii, wherein the mesh of conductors comprises a mesh of wires.

ix. The method according to embodiment vii or viii, further comprising the steps of:
determining a valid open request;
opening the roller shutter when the valid open request is determined;
determining when a user has exited the vehicle; and
closing the roller shutter when the user exit has been determined.

x. The method according to any one of embodiments vii to ix, wherein the step of determining when a user has exited the vehicle is based on a signal from an accelerometer attached to the vehicle.

xi. The method according to any one of embodiments vii to x, wherein the step of determining when a user has exited the vehicle is based on a signal from an accelerometer attached to the user.

xii. A computer program for securing a physical space within a vehicle using a roller shutter comprising a protective barrier configured to be in a rolled up, open, state, and in a rolled down, protective state, and a mesh of conductors being attached to the protective barrier; the computer program comprising computer program code which, when run on a roller shutter causes the roller shutter to:
detect a physical break in the mesh of conductors; and
signal that a break-in is detected when a break in the mesh of conductors is connected.

xiii. A computer program product comprising a computer program according to embodiment xii and a computer readable means on which the computer program is stored.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A roller shutter for securing a physical space within a vehicle, the roller shutter comprising:
a protective barrier configured to be in a rolled up, open, state, and in a rolled down, protective state;
a mesh of conductors being attached to the protective barrier;
a processor; and
a memory storing instructions that, when executed by the processor, cause the roller shutter to:
detect a physical break in the mesh of conductors;
when a break in the mesh of conductors is detected, signal that a break-in is detected;
determine a valid open request;
open the roller shutter when the valid open request is determined;
determine when a user has exited the vehicle; and
close the roller shutter when the user exit has been determined.

2. The roller shutter according to claim 1, wherein the mesh of conductors comprises a mesh of wires.

3. The roller shutter according to claim 1, wherein the instructions to determine when a user has exited the vehicle are based on a signal from an accelerometer attached to the vehicle.

4. The roller shutter according to claim 1, wherein the instructions to determine when a user has exited the vehicle are based on a signal from an accelerometer attached to the user.

5. A vehicle comprising the roller shutter according to claim 1.

6. A method for securing a physical space within a vehicle using a roller shutter comprising a protective barrier configured to be in a rolled up, open, state, and in a rolled down, protective state, and a mesh of conductors being attached to the protective barrier, the method comprising:
  detecting a physical break in the mesh of the conductors;
  signalling that a break-in is detected when a break in the mesh of conductors is detected;
  determining a valid open request;
  opening the roller shutter when the valid open request is determined;
  determining when a user has exited the vehicle; and
  closing the roller shutter when the user exit has been determined.

7. The method according to claim 6, wherein the mesh of conductors comprises a mesh of wires.

8. The method according to claim 6, wherein the step of determining when a user has exited the vehicle is based on a signal from an accelerometer attached to the vehicle.

9. The method according to claim 6, wherein the step of determining when a user has exited the vehicle is based on a signal from an accelerometer attached to the user.

10. A non-transitory computer-readable medium comprising a computer program stored thereon for securing a physical space within a vehicle using a roller shutter comprising a protective barrier configured to be in a rolled up, open, state, and in a rolled down, protective state, and a mesh of conductors being attached to the protective barrier; the computer program comprising computer program code which, when run on a roller shutter causes the roller shutter to:
  detect a physical break in the mesh of conductors;
  signal that a break-in is detected when a break in the mesh of conductors is detected;
  determine a valid open request;
  open the roller shutter when the valid open request is determined;
  determine when a user has exited the vehicle; and
  close the roller shutter when the user exit has been determined.

* * * * *